United States Patent
Riis et al.

(10) Patent No.: US 9,144,301 B2
(45) Date of Patent: Sep. 29, 2015

(54) LIFTING COLUMN, PREFERABLY FOR HEIGHT ADJUSTABLE TABLES

(71) Applicant: LINAK A/S, Nordborg (DK)

(72) Inventors: Martin Riis, Sydais (DK); Ulrik N. Rasmussen, Sønderborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 14/363,018

(22) PCT Filed: Dec. 5, 2012

(86) PCT No.: PCT/DK2012/000129
§ 371 (c)(1),
(2) Date: Jun. 5, 2014

(87) PCT Pub. No.: WO2013/083128
PCT Pub. Date: Jun. 13, 2013

(65) Prior Publication Data
US 2014/0360415 A1    Dec. 11, 2014

(30) Foreign Application Priority Data

Dec. 6, 2011 (DK) .................................. 2011 00949

(51) Int. Cl.
*A47B 9/20* (2006.01)
*F16B 7/14* (2006.01)

(52) U.S. Cl.
CPC ... *A47B 9/20* (2013.01); *F16B 7/14* (2013.01); *A47B 2200/0054* (2013.01)

(58) Field of Classification Search
CPC ............. A47B 9/20; A47B 2200/0051; A47B 2200/0052; A47B 2200/0053; A47B 2200/0054

USPC ....................... 108/147.19, 147.21; 248/354.1
See application file for complete search history.

(56) References Cited

U.S. PATENT DOCUMENTS 4,751,884 A * 6/1988 Ball .............................. 108/147
4,807,836 A * 2/1989 Price et al. ............... 248/123.11

(Continued)

FOREIGN PATENT DOCUMENTS

DE    29812762    10/1998
DE    29908130    9/1999

(Continued)

OTHER PUBLICATIONS

English Abstract of EP1004784.

*Primary Examiner* — Hanh V Tran
(74) *Attorney, Agent, or Firm* — Dykema Gossett PLLC

(57) ABSTRACT

A lifting column preferably, for height adjustable tables, includes a guide (5) and a drive unit (9), the guide (5) including at least a first member (5a) and a second member (5b), the members (5a, 5b, 5c) being arranged mutually telescopically relative to each other. At the end of the first member (5a) from which the second member (5b) can be displaced sliders are arranged on an internal side thereof. At the end of the second member (5b) extending into the first member (5a) sliders are likewise arranged on the outside thereof. In a first plane the sliders have a first, a large, prestressing between the first member (5a) and the second member (5b), while the sliders in the second plane have a second, a small, prestressing between the first (5a) and second member (5b). Thus, a good damping of vibrations of the table is achieved in case of exposure to horizontal forces.

15 Claims, 5 Drawing Sheets

(56) References Cited

U.S. PATENT DOCUMENTS

| | | | | |
|---|---|---|---|---|
| 5,285,733 | A | * | 2/1994 | Waibel ..................... 108/147.19 |
| 5,349,780 | A | * | 9/1994 | Dyke ................................ 47/47 |
| 5,385,323 | A | * | 1/1995 | Garelick ........................ 248/161 |
| 5,579,557 | A | * | 12/1996 | Boden ............................ 16/429 |
| 6,843,183 | B2 | * | 1/2005 | Strong ..................... 108/147.21 |
| 7,163,184 | B2 | | 1/2007 | Nielsen |
| 8,430,218 | B2 | | 4/2013 | Klinke |
| 8,672,284 | B2 | | 3/2014 | Klinke |
| 2002/0043597 | A1 | * | 4/2002 | Forsberg ..................... 248/188.8 |
| 2002/0050112 | A1 | * | 5/2002 | Koch et al. ................. 52/651.07 |
| 2011/0061570 | A1 | * | 3/2011 | Klinke et al. ..................... 108/20 |
| 2011/0203496 | A1 | * | 8/2011 | Garneau et al. ............... 108/147 |

FOREIGN PATENT DOCUMENTS

| | | |
|---|---|---|
| DK | 175992 | 11/2005 |
| EP | 1004784 | 5/2000 |
| EP | 1250866 | 10/2002 |

\* cited by examiner

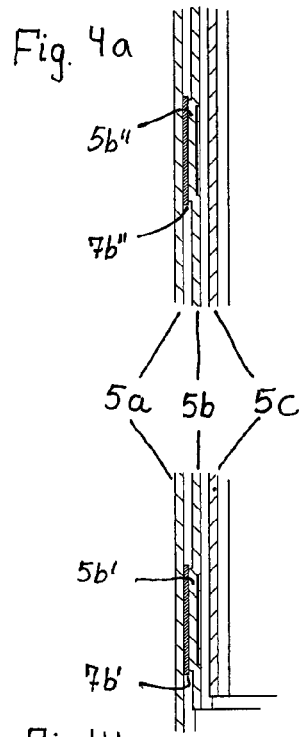
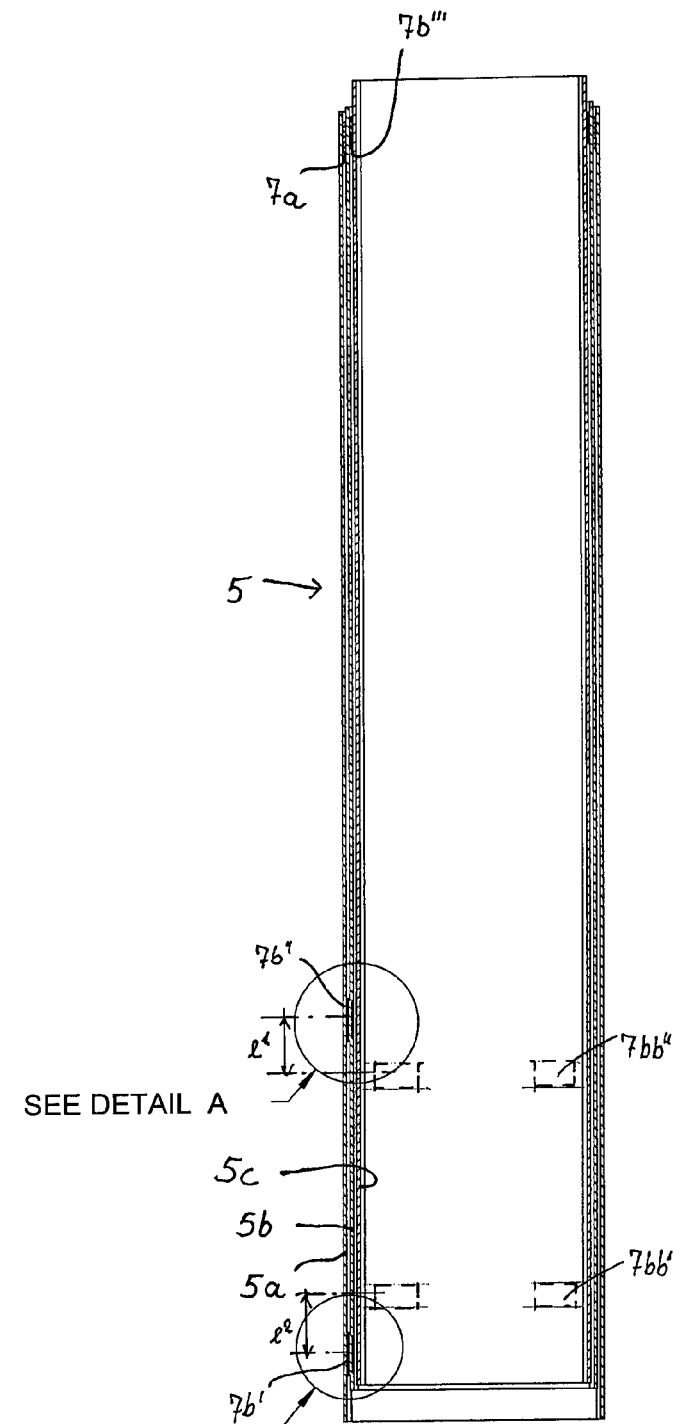

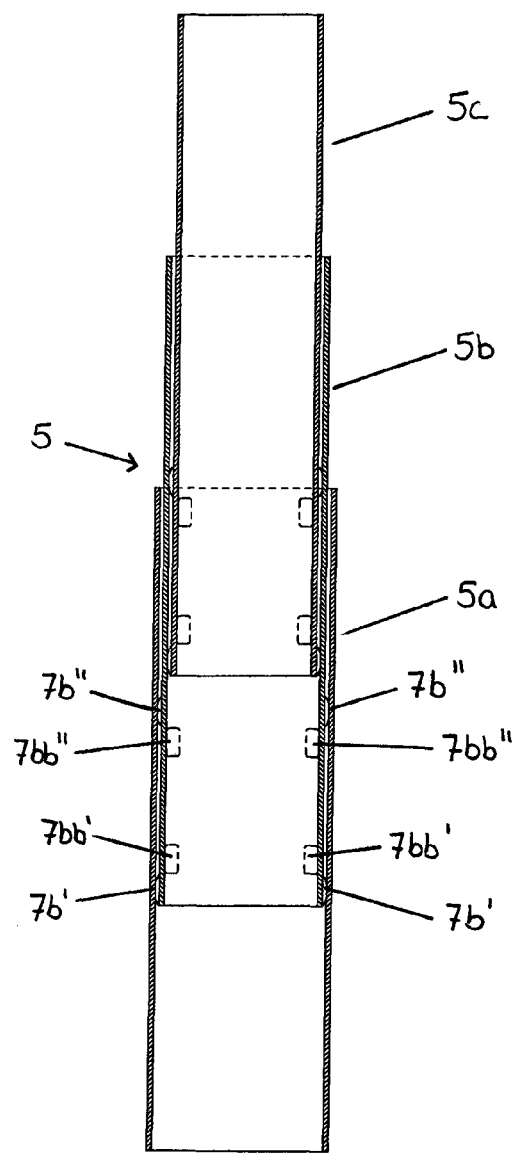
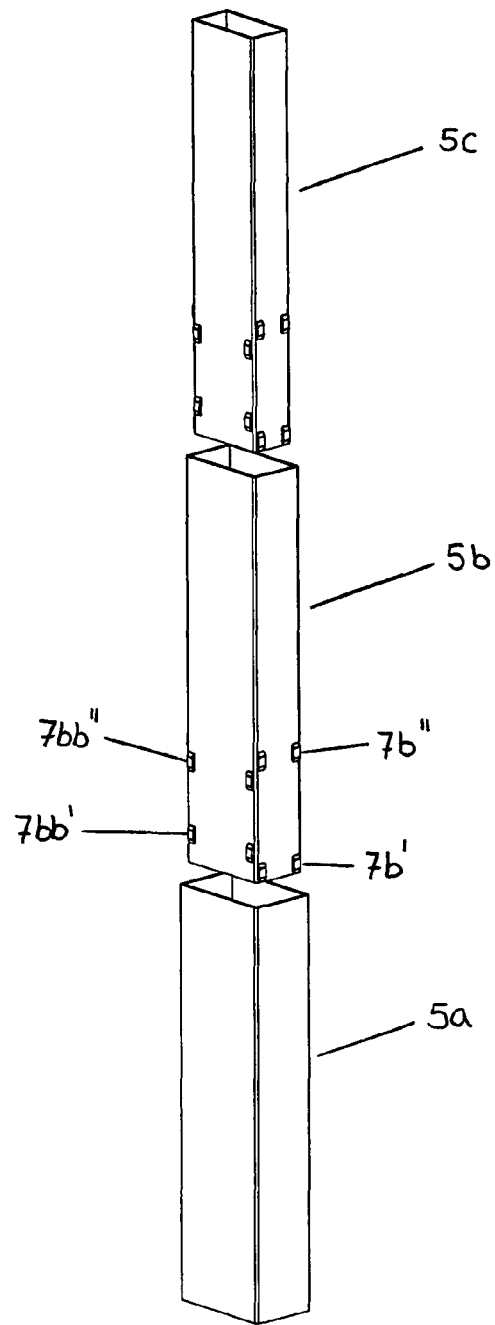
Fig. 5
Fig. 6

LIFTING COLUMN, PREFERABLY FOR HEIGHT ADJUSTABLE TABLES

BACKGROUND OF THE INVENTION

1. Field of the Invention

The Invention relates to a lifting column, preferably for height adjustable tables, comprising a guide and a drive unit, where the guide comprises at least a first member and a second member, where the members are mutually telescopically arranged relative to each other, and where a first set of sliders is arranged on an internal side of the first member at the end of the first member into which the second member extends and may be displaced out of, and where a second and third set of sliders are arranged on the outside of the second member at the end of the second member which extends into the first member. The invention further relates to a height adjustable table equipped with at least one such lifting column.

2. The Prior Art

For explanation of the invention reference is made to height adjustable or so-called sit/stand work tables, where the underframe comprises an electrically driven lifting column at each side of the work table and where the lower end of the lifting columns are furnished with a foot. A table top is secured to an upper end of the lifting columns either directly or by means of a top frame. The lifting columns comprise a guide which typically consists of two or three mutually telescopically arranged members. In an embodiment, which is probably the most commonly used so far, the member having the largest cross section is placed at the bottom. In another embodiment the lifting column is "turned around", such that the member having the smallest cross section is at the bottom; this embodiment is also known as "up-side down". In the first mentioned embodiment, the one with the member having the largest cross section at the bottom, the upper end of the lifting column may be equipped with a cross member, connecting the two lifting columns, which gives a good sideways stability of the table. In some embodiments without a cross member the upper end of the lifting columns is furnished with a strut between the lifting column and the table top or in connection with a motor housing on the column, located perpendicular to the guide.

The stability of the table is a crucial factor. A particular problem is vibrations of the table when it is exposed to a horizontal force. The horizontal force can be a result of the work being performed at the table or machines, e.g., a printer, located thereon. The back and forth movements of the printer head can cause vibrations of the table. DIN 4554, relating to office furniture, determines a threshold value for the allowable vibrations, just as a test for testing the vibration properties of the table, popular known as "the eraser test" is prescribed. The vibrations should not be too big and the table should settle again quickly.

Between the individual members in the guides of the lifting columns sliders are arranged. These sliders serve the purpose of compensating for manufacturing tolerances of the members. For that purpose the sliders may be designed with an adjustable thickness, such that they can be adjusted to the present groove between the members, cf., e.g., EP 1 250 866 A1 to Assenburg BV, EP 1 004 784 A1 to Magnetic Elektromotoren AG and DE 298 12 762 U1 to Phoenix Mecano Komponenten AG. Alternatively, a range of sliders with various thicknesses fitting the present groove between the members may be provided, cf., e.g., WO 03/047389 A1 to Linak A/S, where it is further suggested to make a local deformation opposite the slider for further equalization of the tolerances.

The sliders also serve the purpose of keeping the friction between the individual members as low as possible. The amount of the friction has a direct influence on the force and energy needed to displace the guide. Popularly speaking, the more friction the larger motor and thus energy consumption is required.

Another factor for the stability of a lifting column is the overlapping of the individual members in the guide, i.e., the portion of the member protruding into the previous member. A larger overlapping of the telescopic members results in a better stability of the lifting column. There is, however, a limit to how large the overlapping can be. The adjustment of the height of the tables is also determined through various standards. According to the European standard EN 527, the work table must be adjustable from 60 cm to 120 cm in height, but some standards prescribe an even larger height, e.g., the Dutch standard NEN 2449 which prescribes an interval from 62 cm to 128 cm. This naturally limits the size of the overlapping between the members. In order to meet the requirement for the minimum and the maximum height, it is necessary to have three-part columns, i.e., columns having a guide consisting of three telescopic members. Due to tolerances the innermost member can yield a little relative to the intermediate member, which in turn can yield a little relative to the outermost member.

Especially for work tables in the nature of desks where the design is of vital importance, it is a pronounced wish that lifting columns appearing as table legs are slim. The ratio between a relatively small cross section relative to the length results in the lifting columns themselves appearing with a certain elasticity.

As regards work tables the problem of vibrations is particularly significant in the longitudinal direction of the table, while the vibrations in the transverse direction of the table are usually not a problem. Part of the explanation is that the feet extend in the transverse direction of the table while the dimension of the feet in the sideways direction in comparison is relatively small. As to lifting columns with guides having a rectangular cross section, the lifting columns are usually also positioned such that the broadside faces across the table while the narrow side faces in the longitudinal direction of the table.

The purpose of the invention is to provide a solution for reducing vibrations of tables as a result of horizontal forces.

This is achieved according to the invention with a lifting column where the second set of sliders, which describes a first plane, has been applied a given first prestressing between the first member and the second member, while the third set of sliders, which altogether describes a second plane which is different from the first plane, has been applied a given second prestressing between the first member and the second member, where the second applied prestressing is smaller than the first applied prestressing. Thus, it has turned out that this deliberate differentiation of the prestressing surprisingly enables a significant reduction of the vibrations in the lifting columns.

The prestressing of the sliders can be done in various ways, e.g., by pressing sliders with a certain thickness into the groove between the members, where experiments have determined how thick the sliders should be in order to obtain the desired prestressing. To achieve the desired, prestressing places great demands on the manufacturing tolerances. Another possibility is to use adjustment screws for the prestressing, this is however not particularly manufacturing-friendly. In a preferred embodiment of the invention the prestressing is created by an embossing of the member opposite the sliders. By creating a deformation of the side wall of the member, the desired prestressing may quite accurately be achieved. The embossing can be made both on the outer side of the outermost member as well as on the inner side of the innermost member. With an embossing on the Inner side visible marks on the outer side of the guide appearing as table legs are avoided.

In an embodiment two sets of sliders are placed after each other at the end of the member extending into the second member and the sliders in the first plane and in the second plane are offset. As it turns out, this has proven to provide a good dampening of the vibrations. In the plane where the small prestressing is provided, it has turned out that this dampening is further improved with a slightly larger prestressing of the bottommost sliders than the topmost sliders of the two sets of sliders.

As to lifting columns having three or more members, the invention has proven that a prestressing of the sliders between a fixed member and the first successive member arranged telescopically relative to the fixed member is sufficient. The prestressing between the additional subsequent members has turned out not to be of much significance. Since the prestressing is only provided at the fixed member, the manufacturing costs and the cost of tools are reduced.

Through experiments an expedient embodiment of the invention has been found, where the large prestressing is of a size resulting in a friction of between 15-30 kg between the respective sliders and the member sliding against these, while the small prestressing is of a size resulting in a friction of 0-5 kg between the respective sliders and the member sliding against these.

In an embodiment the telescopic members in the lifting columns are constituted by pipe profiles which may have a random cross section, but a square cross section provides well-defined planes for the prestressing of the sliders and the effect of the invention thus becomes unambiguous. In an embodiment the members have a rectangular cross section, where one side, the broad side, in the cross section is significantly larger than the width of the other side, the narrow side. A rectangular cross section allows for an even more unambiguous differentiation of the small and the large prestressing relative to each other. In an embodiment the broadside of the profiles in the guides has a width, which is about one and a half times larger than the narrow side or even larger.

When the lifting columns are mounted in a structure they are expediently placed such that the second, the small, prestressing faces in the direction in which the transversal forces which should be dampened occur.

The first, the large, prestressing in the lifting column(s) is provided in a direction across the table top and the second, the small, prestressing is provided along the table top.

The invention further relates to a height-adjustable work table comprising a table top carried by at least one lifting column and where the table top has two long sides, where one long side constitutes a rear side and the other a front side, and where the user of the table is placed at the front side, just as the table top has two ends extending between the front side and the rear side, and where the first, the large, prestressing in the lifting column(s) (5) is provided in a direction across the table top and that the second, the small, prestressing is provided in the longitudinal direction of the table top.

BRIEF DESCRIPTION OF THE DRAWINGS

The invention will be described more fully below with reference to the accompanying drawing, in which:

FIG. 4 shows a longitudinal section through a guide equipped with sliders and where deformations are made opposite these in order to achieve the desired prestressing of the sliders,
FIG. 4a shows a section A in FIG. 4,
FIG. 4b shows a section B in FIG. 4,
FIG. 5 shows a longitudinal section through the guide shown in an extended position,
FIG. 6 shows an exploded view of the guide.

DETAILED DESCRIPTION OF THE EMBODIMENT

Figure 1:
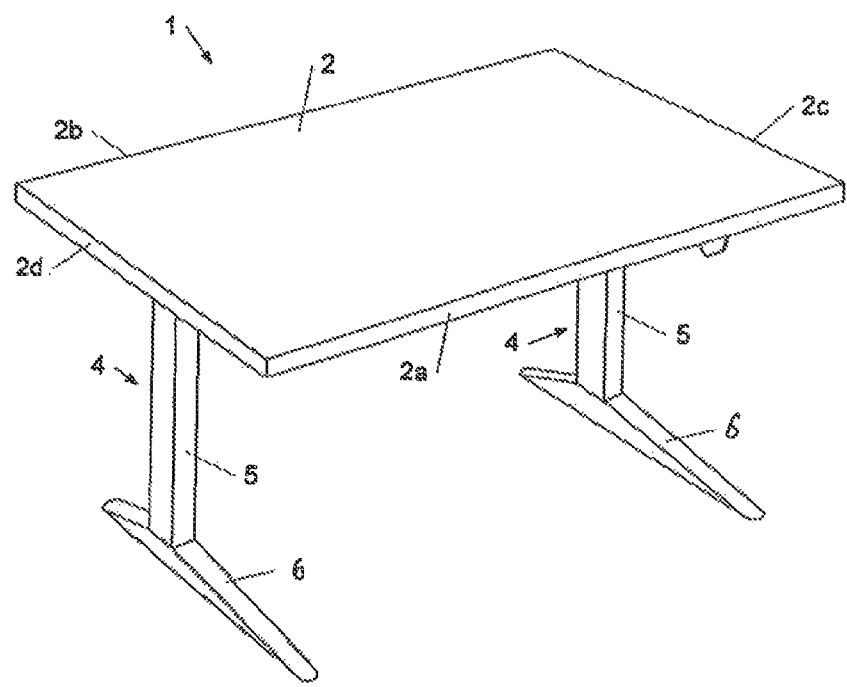
FIG. 1 shows a desk with lifting columns.
Figure 2:
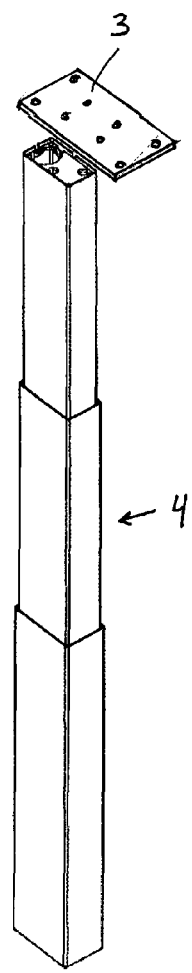
FIG. 2 shows one of the lifting columns in its fully extended position.

The height adjustable work table 1 shown in FIG. 1. comprises a table top 2 having a front side 2a (the side where a user of the table is located), a rear side 2b, a right end 2c and a left end 2d. At the right end 2c and the left end 2d, respectively, there is a lifting column 4, which with an upper end is mounted to the table top by means of a mounting plate 3 (see FIG. 2), which is screwed onto the upper end of the lifting column and which further is screwed onto the underside of the table top 2. The bottom part of each of the lifting columns 4 is furnished with an elongated foot 6 extending across the table. In FIG. 2 a lifting column 4 is shown in its fully extended position. It comprises a guide 5 with an outermost member 5a (see FIG. 4), onto which the foot 6 is mounted, an intermediate member 5b and an innermost member 5c. The three members 5a, 5b, 5c of the guide are mutually telescopically arranged, such that the outermost member 5a having the largest cross section is stationary while the intermediate member 5b is extended out of the stationary member 5a and the innermost member 5c is extended out of the Intermediate member 5b.

FIG. 4 shows a longitudinal section through the guide 5, the three members 5a, 5b, 5c thereof consisting of steel profiles having a rectangular cross section. The lifting columns are orientated such that the two narrow sides of the guides 5 are parallel to the front and rear side 2a, 2b of the table top while the two broadsides of the guides 5 are parallel to the ends 2c, 2d of the table top. Between the members 5a, 5b, 5c are located brick-shaped massive sliders of a plastics material. The sliders are fitted to the groove between the individual members 5a, 5b, 5c. Sliders 7a for supporting the intermediate member 5b are secured to the inner side of the upper end of the outermost member 5a. The intermediate member 5b is likewise supported at the bottom by a set of sliders 7b', 7b'' located at a mutual distance and secured to the outer side of the intermediate member 5b. These sliders 7b', 7b'' support and slide on the inner side of the outermost member 5a. The innermost member 5c is supported and guided by sliders 7b''' secured at the top on the internal side of the intermediate member 5b. Further, there are sliders on the lower, exterior side of the innermost member 5c sliding against the inner side of the intermediate member 5b. These sliders are however not shown in the drawing.

As vibration dampening as a result of horizontal forces on the table top in the longitudinal direction, a prestressing of the sliders has been created, which function between the outermost member 5a and the intermediate member 5b. The prestressing is created by a local deformation of the side wall of the member where the slider is secured against the member on which the slider slides. The deformations 5b',5k'' are shown in FIGS. 4a and 4b opposite the sliders 7b',7b''.

The sliders shown in FIGS. 4, 4a and 4b are placed on the narrow sides of the guide. There are corresponding sliders on the broadside of the guide. The sliders of the intermediate member 5b sliding on the inner side of the outermost member 5a are indicated with a dotted line. As noticed these sliders are positioned with a certain distance $l^1$ and $l^2$ from the sliders on the narrow side of the guide.

With an embossing of the side wall of the intermediate member 5b, the sliders 7bb', 7bb" are subjected to a first, a large, prestressing against the outermost member in the order of 10-20 kg. The sliders 7b', 7b" on the narrow side of the intermediate member 5 are subjected to a small prestressing of 0-5 kg. The sliders 7a at the upper end of the outermost tube are not subjected to a prestressing. When the table top is exposed to a horizontal force and the intermediate member starts to vibrate, the sliders 7b', 7b" on the narrow side of the intermediate member 5b will function as vibration dampeners. The size of the dampening depends on the frictional force and the distance between the respective sliders on the narrow sided and broadsides of the member 5. It has further turned out that if the prestressing of the sliders on the narrow side is graduated, an improved dampening of the vibrations can be achieved. The lowermost sliders 7b' should, in that respect, be provided with a slightly larger prestressing than the topmost sliders 7b". The topmost sliders 7b" should at the prestressing be kept free from play, while the prestressing of the lowermost sliders should only just hold these against the inner side of the outermost member 5a.

A corresponding prestressing of the sliders between the innermost member 5c and the intermediate member 5b may of cause also be provided, but it has turned out that the prestressing of the sliders between the intermediate member 5b and the outermost member 5a is of the most importance for the dampening.

Figure 3:
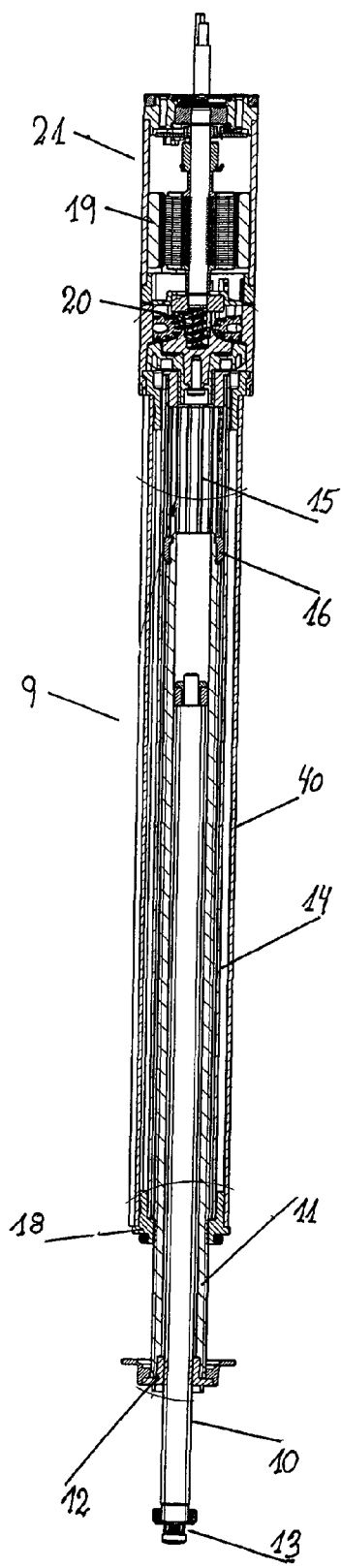
FIG. 3 shows a linear actuator located inside the lifting columns.

FIG. 3 of the drawing shows a drive unit in the shape of a linear actuator 9 for bringing about the telescopic movement of the lifting column 4. The linear actuator comprises a spindle unit consisting of a massive spindle 10 and a hollow spindle 11, both having external thread. At the lower end of the hollow spindle a spindle nut 12 for the massive spindle 10 is secured, said spindle nut is designed as a bushing having internal thread. By rotating the hollow spindle 11 this will screw itself up the massive spindle 10, as this is secured against rotation at its free end 13. The hollow spindle 11 is surrounded by a drive tube 14 which on the inner side is designed with a number of axially running grooves 15. On the external side of the upper end of the hollow spindle 11 a ring 16 having a number of fins on its outer side is secured, which protrude into the grooves 15 on the drive tube. In addition to the drive tube 14 there is a support tube 17 at the lower end of which a spindle nut 18 for the hollow spindle 11 is secured. The spindle nut 18 is in the shape of a bushing having internal thread. When the drive tube 14 is rotated the support tube 17 will screw itself up the hollow spindle 11 as the support tube at the upper end is secured against rotation. As the hollow spindle 11 is rotated this will screw itself up the massive spindle 10 as described above, i.e. the axial movement is the collective movement of both the hollow and massive spindle. The drive tube 14 is driven by an electric motor 19 through a gear unit 20 located in a housing 21. The gear unit comprises a worm gear, which through a set of gear wheels drives a crown wheel, which drives the drive tube 14.

Figure 7:
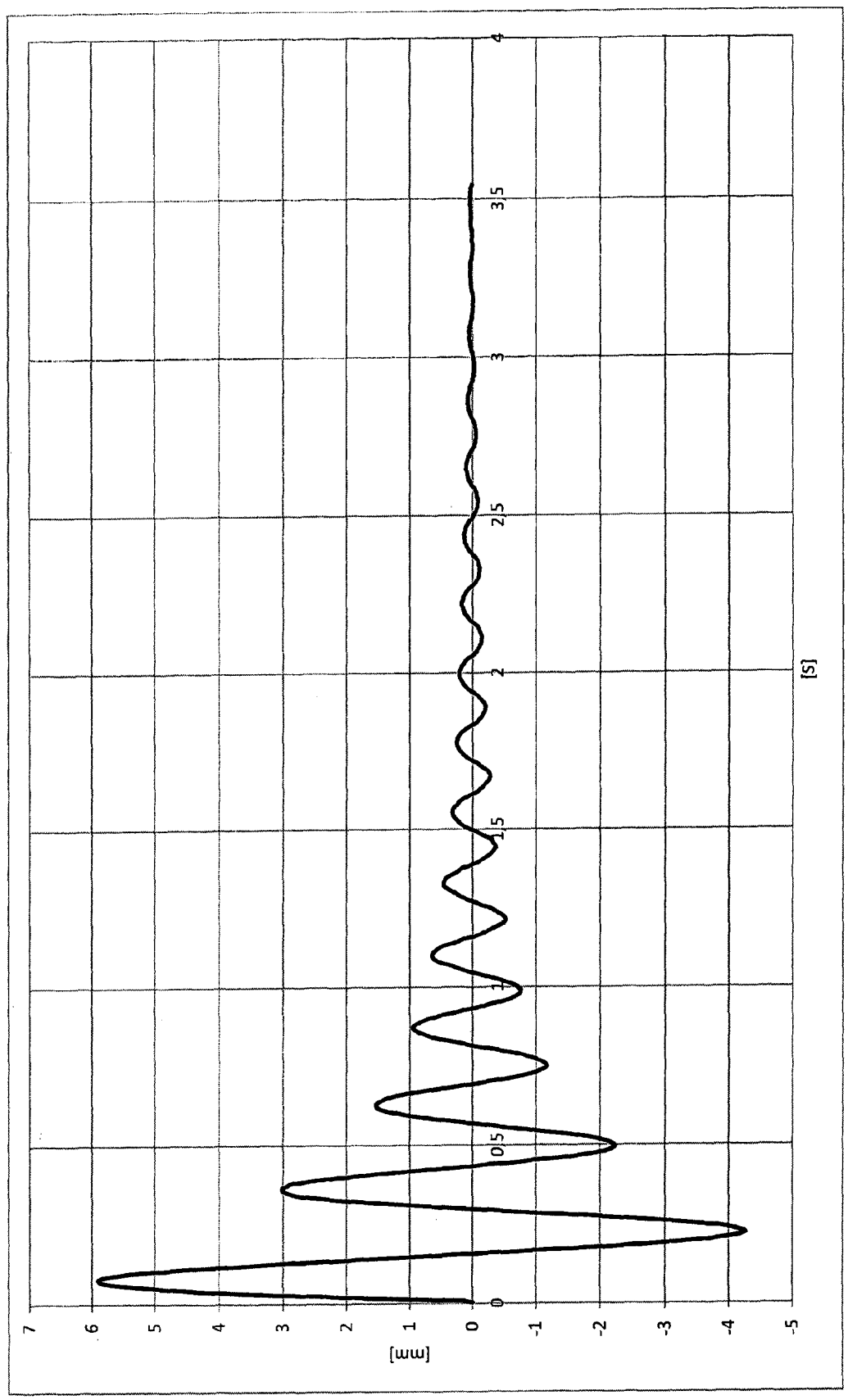
FIG. 7 shows the result of a vibration test.

The graph shown in FIG. 7 of the drawing is based on the test method stated under item 5.2.6 in DIN 4554 where the table was equipped with lifting columns the outermost member of which having the external measures 60×100 mm.

The invention is here particularly described in connection with height adjustable tables, but it is understood that the invention may be used in connection with lifting columns for other purposes such as lifting columns for hospital and case beds. Further, the invention is described above in connection with guides of pipe profiles, particularly having a rectangular cross section. It is understood that the guides does not necessarily have to be closed pipe profiles, they can also have an L- or C-shaped cross section. A lifting column with an L-shaped cross section is i.a. shown in FIG. 5 of DK 175992 B1 to Gert Godvig Lassen et al (Conset A/S). With a pipe profile having a circular cross section, as e.g. shown in WO2009/146707 A1 to Linak A/S the sliders may be arranged with 90° and a prestressing of the two intermediate planes perpendicular to each other may e.g. be provided. As an example of another pipe profile reference is made to WO 03/003876 A1 to Linak A/S where the profile has two parallel narrow sides and two arched broadsides. Here, the prestressing may be provided as described in connection with the rectangular cross section.

The invention claimed is:

1. A lifting column comprising:
a drive unit, and
a guide, said guide comprising at least a first member and a second member, said first and second members being mutually telescopically arranged relative to each other, and a first set of sliders arranged on an internal side of the first member at an end thereof into which the second member extends and may be displaced out of, and second and third sets of sliders arranged on an outside of the second member at an end of the second member which extends into the first member, and wherein the second set of sliders define a first plane and provide a first prestressing between the first member and the second member, while the third set of sliders define a second plane which is different from the first plane, provide a second prestressing between the first member and the second member, the second prestressing being smaller than the first prestressing.

2. The lifting column according to claim 1, wherein the prestressing is created by an embossing of the member opposite the sliders.

3. The lifting column according to claim 1, including at the end of the member which extends into the second member two sets of sliders subsequent to each other, the sliders in one plane and in the other plane are offset.

4. The lifting column according to claim 3, wherein the two sets of sliders in the plane where a second, a small, prestressing of these is provided, is provided with a somewhat larger prestressing of the bottommost sliders compared to the topmost sliders.

5. The lifting column according to claim 1, comprising three or more members, where the said prestressing is arranged between a fixed member and the consecutive member telescopically arranged relative to the fixed member.

6. The lifting column according to claim 1, wherein the large prestressing is of a size resulting in a friction of between 15-30 kg between the respective sliders and the member, which slides against these, while the small prestressing is of a size resulting in a friction of between 0-5 kg between the respective sliders and the member, which slides against these.

7. The lifting column according to claim 1, wherein the members are constituted by pipe profiles having a square cross-section.

8. The lifting column according to claim 1, wherein the members have a rectangular cross section where one side, the broadside, in the cross section is considerably larger than the length of the other side, the narrow side.

9. The lifting column according to claim 8, wherein the broadside has a length which is approximately one and a half times larger than the narrow side or larger.

10. A height adjustable work table comprising a table top carried by at least one lifting column as defined in claim 1, and where the table top has two long sides where one side constitutes a rear side and the other constitutes a front side, where the user of the table is placed at the front side, and two ends extending between the front side and the rear side, and where the large prestressing in the lifting column(s) is provided in the transverse direction of the table top and that the small prestressing is provided in the longitudinal direction of the table top.

11. A vibration-resistant lifting column which comprises:
a drive unit, and
a guide assembly, said guide assembly including a first elongated member and a second elongated member located within said first elongated member, said second elongated member being telescopically movable beyond an end of said first elongated member, and having two sides which define non-parallel planes, a first set of sliders positioned on an internal side of said first elongated member at said end thereof to contact said second elongated member therein, and second and third sets of sliders positioned on external sides of said second elongated member which are non-parallel to contact said first elongated member, said second and third sets of sliders providing different prestressing between the first and second elongated members.

12. The vibration-resistant lifting column according to claim 11, wherein said first, second and third sets of sliders comprise brick-shaped elements.

13. The vibration-resistant lifting column according to claim 12, wherein said brick-shaped elements comprise plastic material.

14. The vibration-resistant lifting column according to claim 11, wherein each of said first and second elongated members have rectangular cross section.

15. The vibration-resistant lifting column according to claim 14, wherein said second and third sets of sliders are positioned on external surfaces of adjacent sides of said second elongated member and are offset from each other in a longitudinal direction of said second elongated member.

* * * * *

UNITED STATES PATENT AND TRADEMARK OFFICE
CERTIFICATE OF CORRECTION

PATENT NO.       : 9,144,301 B2
APPLICATION NO.  : 14/363018
DATED            : September 29, 2015
INVENTOR(S)      : Riis et al.

It is certified that error appears in the above-identified patent and that said Letters Patent is hereby corrected as shown below:

On the title page item (72) should read:
Inventors: Martin Riis, Sydals (DK); Ulrik N. Rasmussen, Sønderborg (DK)

Signed and Sealed this
Twenty-second Day of March, 2016

Michelle K. Lee
*Director of the United States Patent and Trademark Office*